US007198009B2

(12) United States Patent
Crist et al.

(10) Patent No.: US 7,198,009 B2
(45) Date of Patent: Apr. 3, 2007

(54) FREQUENCY SPECTRUM CAPTURE AND COMPARE TECHNIQUE FOR VALID BARK DETECTION

(75) Inventors: Timothy J. Crist, Tucson, AZ (US); Francisco J Napolez, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 0 days.

(21) Appl. No.: 10/752,953

(22) Filed: Jan. 7, 2004

(65) Prior Publication Data

US 2005/0145197 A1 Jul. 7, 2005

(51) Int. Cl.
*A01K 27/00* (2006.01)
*A01K 15/02* (2006.01)

(52) U.S. Cl. ...................... 119/718; 119/719
(58) Field of Classification Search ........... 119/859, 119/719, 718, 712, 862
See application file for complete search history.

(56) References Cited

U.S. PATENT DOCUMENTS

| 4,180,013 | A | * | 12/1979 | Smith | 119/718 |
|---|---|---|---|---|---|
| 4,947,795 | A | | 8/1990 | Farkas | 119/29 |
| 5,061,918 | A | * | 10/1991 | Hunter | 340/573.2 |
| 5,353,744 | A | * | 10/1994 | Custer | 119/719 |
| 5,465,687 | A | * | 11/1995 | Custer | 119/719 |
| 5,601,054 | A | * | 2/1997 | So | 119/718 |
| 5,640,932 | A | * | 6/1997 | Bianco et al. | 119/720 |
| 6,058,889 | A | * | 5/2000 | Van Curen et al. | 119/721 |
| 6,135,060 | A | * | 10/2000 | So | 119/720 |
| 6,474,269 | B2 | * | 11/2002 | So | 119/720 |
| 6,598,563 | B2 | * | 7/2003 | Kim et al. | 119/720 |
| 6,651,592 | B2 | * | 11/2003 | Maddox et al. | 119/720 |
| 6,668,760 | B2 | * | 12/2003 | Groh et al. | 119/718 |
| 6,757,574 | B2 | * | 6/2004 | Gardner et al. | 700/94 |
| 6,830,014 | B1 | * | 12/2004 | Lalor | 119/859 |
| 6,860,240 | B2 | * | 3/2005 | Kim et al. | 119/719 |

* cited by examiner

*Primary Examiner*—Son T. Nguyen
(74) *Attorney, Agent, or Firm*—Cahill, von Hellens & Glazer P.L.C.

(57) ABSTRACT

An electronic apparatus (1) supported against a dog's skin to control vocalizing by the dog electronically converts the vocalizing into a sequence of signals representing frequencies of the vocalizing, and operates a controller to determine if each measured frequency lies within any of a plurality of predetermined frequency sub-ranges and if so, increments cumulative totals of the frequencies which lie in the sub-ranges, respectively, to provide a plurality of cumulative totals that represent a frequency spectrum of the vocalizing. The controller is operated to determine whether the barking sounds constitute a valid bark by comparing the frequency spectrum to a predetermined valid bark frequency spectrum. Appropriate aversive stimulus signals are produced between first and second stimulus electrodes if the vocalizing sounds constitute a valid bark.

12 Claims, 7 Drawing Sheets

FREQUENCY SPECTRUM CAPTURE AND COMPARE TECHNIQUE FOR VALID BARK DETECTION

BACKGROUND OF THE INVENTION

The present invention relates generally to collar-mounted electronic "bark limiter" or dog bark training devices, and more particularly to improvements therein to provide improved, more reliable sensing of vibration due to vocalization and barking of the dog, and also relates to sensing of what constitutes "valid" barking.

A variety of electronic dog training collars have been utilized for applying electrical shock and/or audible stimulus to a dog when it barks. In many situations it is highly desirable to prevent individual dogs or groups of dogs from barking excessively. For example, one dog's barking in a kennel is likely to stimulate other dogs to bark. This is undesirable with respect to the welfare of the dogs themselves and nearby people. Similar problems occur in neighborhoods in which there are dogs that are kept outside at night: if one dog starts barking others are likely to join in, causing a general disturbance.

The closest prior art is believed to include the present assignee's Bark Limiter product and commonly assigned U.S. Pat. No. 4,947,795 by G. Farkas entitled "Barking Control Device and Method", issued Aug. 14, 1990 and incorporated herein by reference. U.S. Pat. No. 4,947,795 discloses a bark training device which includes circuitry in a collar-mounted electrical device that detects the onset of barking and initially produces only a single low level electrical stimulus pulse that gets the dog's attention, but does not initially produce a highly unpleasant level of stimulation. If the dog continues barking, the stimulation levels of the electrical shock pulses are increased at the onset of each barking episode in a stepwise fashion until the stimulus becomes so unpleasant that the dog stops barking for at least a predetermined time, e.g., one minute. After that minute elapses, the circuitry resets itself to its lowest initial stimultion level and remains inactive until barking begins again, and then repeats the process, beginning with the lowest level of stimulation and increasing the stimulus level if barking continues.

A shortcoming of the all of the prior art bark training products is that they detect nearly any sound the dog makes which exceeds a certain level and then automatically applies aversive electrical stimulus to the dog in response to the detected sound. This reduces the effectiveness of the training, or even causes the training to become counterproductive.

SUMMARY OF THE INVENTION

Accordingly, it is an object of the invention to provide an improved animal training device that does not automatically apply aversive electrical stimulus to the dog in response to the detected sound unless the detected sound is accurately determined to be a "valid" barking sound.

Briefly described, and in accordance with one embodiment, the present invention provides a method of operating an electronic apparatus (1) to control vocalizing by a dog, wherein the electronic apparatus includes a housing (2) supported against the animal's skin, first and second stimulus electrodes (5) connected to a surface (9) of the housing, a sensor (6) supported by the housing for producing signals in response to vocalizing by the dog, and control circuitry, including a controller (33), in the housing having an input coupled to an output of the sensor, the control circuitry including output terminals coupled to produce aversive stimulus signals between the first and second stimulus electrodes in response to vocalizing by the dog. The method includes electronically converting vocalizing sounds from the dog into a sequence of corresponding signals representing the frequencies of the vocalizing sounds, providing the sequence of signals as an input to the controller, and operating the controller to determine the frequencies of the sequence of signals during a predetermined interval of time, to determine if each measured frequency lies within any of a plurality of predetermined frequency sub-ranges and if so, to increment cumulative totals of the frequencies which lie in the sub-ranges, respectively, to provide a plurality of cumulative totals that represent a frequency spectrum of the vocalizing sounds. The controller to is operated to determine whether the barking sounds constitute a valid bark by comparing the frequency spectrum to a predetermined valid bark frequency spectrum. Appropriate aversive stimulus signals are produced between the first and second stimulus electrodes if it is determined that the vocalizing sounds constitute a valid bark.

In the described embodiment, the range of frequencies is from 150 hertz to 800 Hz, and there are 16 contiguous sub-ranges within the 150 hertz At all to 800 Hz range, and the predetermined interval of time is approximately 120 milliseconds.

DETAILED DESCRIPTION OF THE PREFERRED EMBODIMENTS

A preferred embodiment of a dog bark limiter of the present invention includes vibration transducer for providing signals representing vocalization or barking by the dog and control circuitry including a controller or processor that executes a capture and compare program to determine if the vocalization by the dog constitutes a "valid" bark. To accomplish this, the controller generates a frequency spectrum of the signals and compares it with a predetermined frequency spectrum to determine if the signals represent a "valid" bark.

Figure 1:
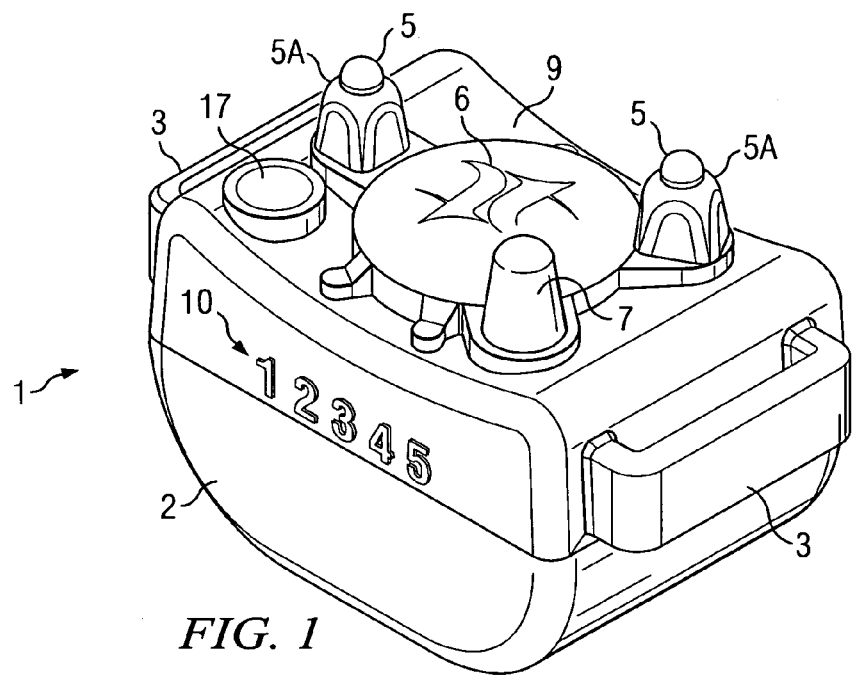
FIG. 1 is a perspective view of a collar-mounted bark limiter unit of the present invention with the collar removed.
Figure 2:
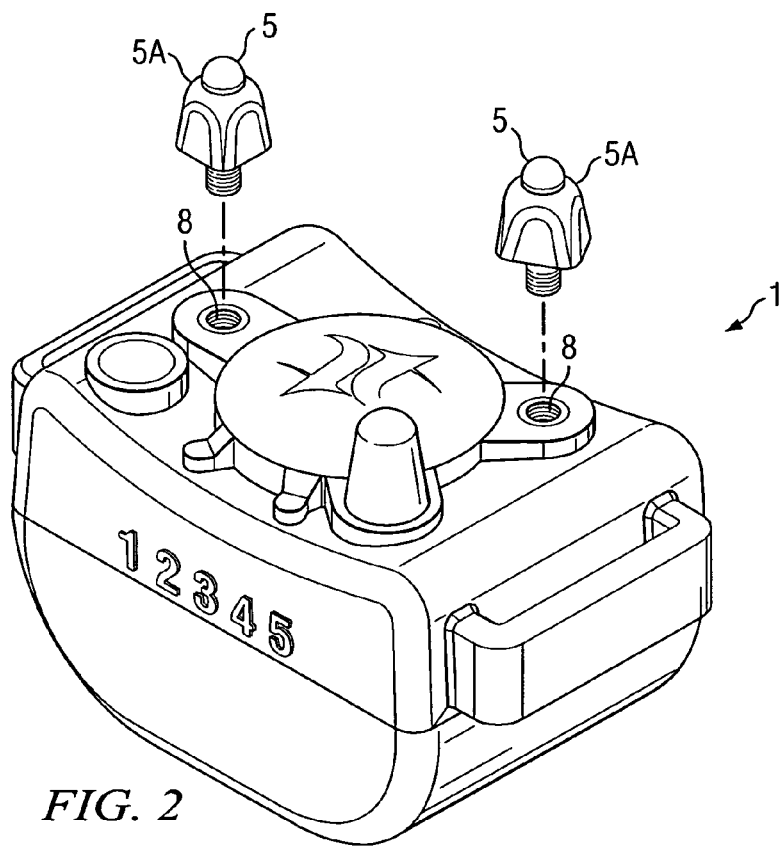
FIG. 2 shows the a partially-exploded view of the bark under unit of FIG. 1.

Referring to FIGS. 1, 2, 3A and 3B, bark limiter 1 includes a housing 2 having a lower section 2A and an upper section 2B. The top surface 9 of upper housing section 2B is slightly concave, to better accommodate the curvature of a dog's neck. A pair of collar-retaining loops 3 are attached to opposite ends of upper housing section 2B, as shown. A typical dog collar (not shown) is passed through loops 3 around the bottom surface of housing 2 to fasten bark limiter 1 to the dog's neck. Two stimulus electrodes 5 are threaded into receiving holes 8 (FIG. 2) in the upper surface 9, and their conductive tips are pressed against the dog's neck to make electrical contact therewith when the collar is tightened. As indicated in FIG. 2, stimulus electrodes 5 are removable. A preferably non-conductive stabilizing post of the same height as stimulus electrodes 5 is rigidly attached to upper surface 9, and is offset from a straight line between stimulus electrodes 5 so the stabilizing post 7 to prevent the conductive electrode tips of stimulus electrodes 5 from "rocking" against the dog's neck.

A dome-shaped membrane 6 that preferably is integrally formed with the upper housing section 2B is disposed on upper surface 9 and constitutes part of an improved vibration sensor 30, which is subsequently described in more detail with reference to FIG. 4. Membrane 6 is approximately 0.035 inches in thickness. A membrane switch 17 extends through an opening 4 in upper surface 9. The above features, except the stimulus electrodes 5B and 5C, on the upper surface 9 of upper housing 2B are all integrally formed as a single unit.

Figure 3A:
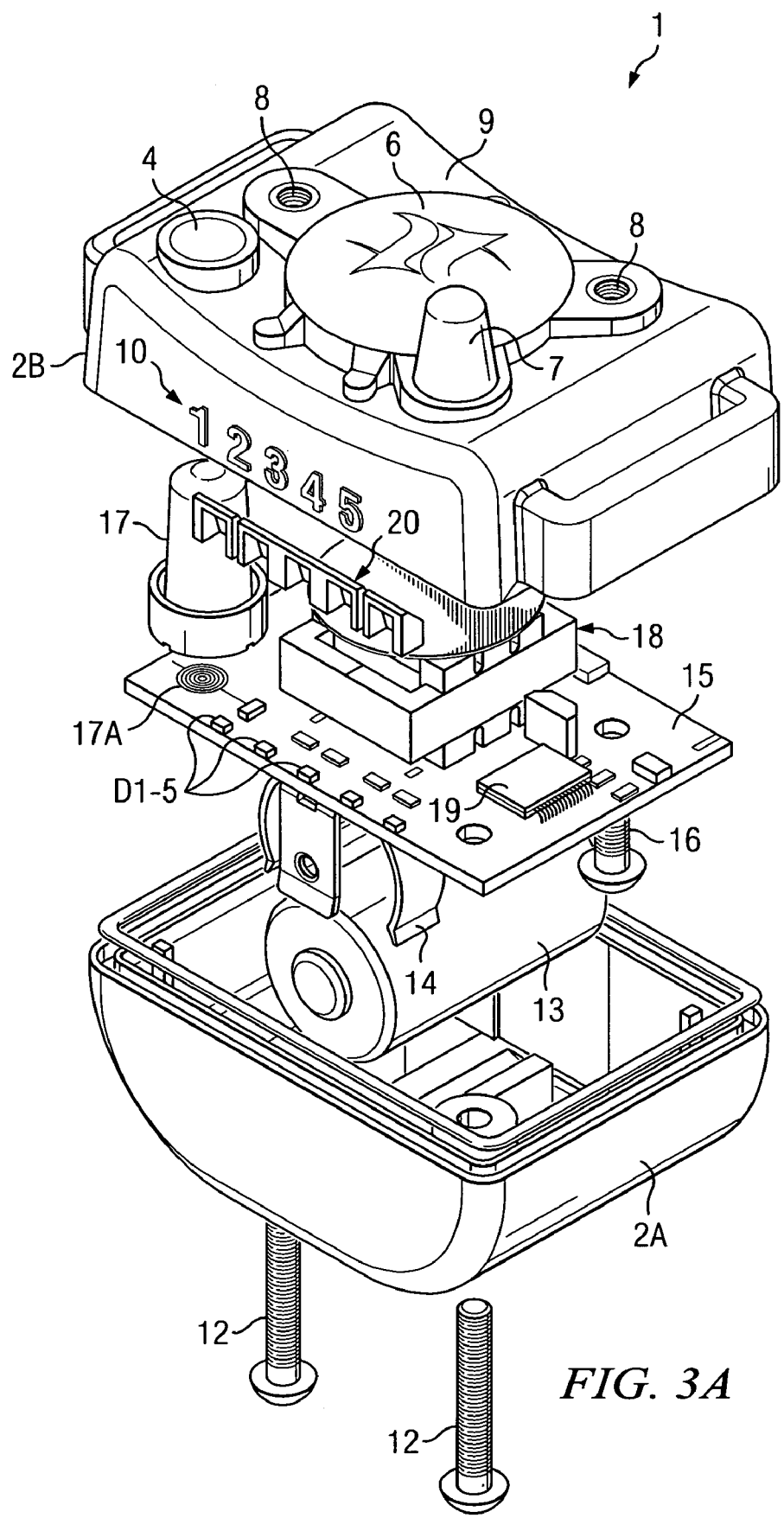
FIG. 3A is a perspective exploded view of the bark limiter unit of FIGS. 1 and 2.
Figure 3B:
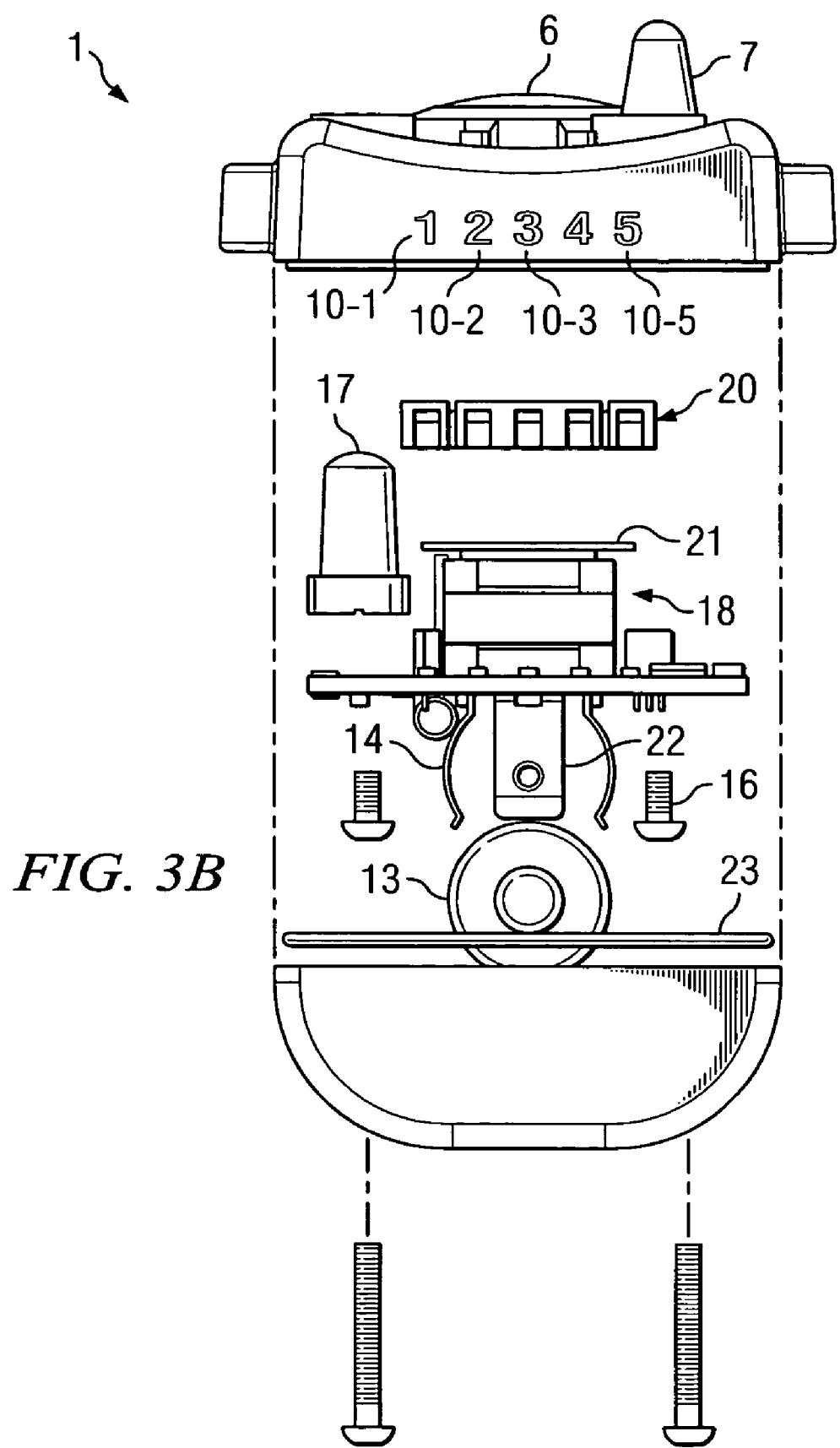
FIG. 3B is a side exploded view of the bark limiter unit as shown in FIG. 3A.

Referring to the exploded views of FIGS. 3A and 3B, lower housing section 2A is attached to upper housing section 2B by means of two screws 12. A printed circuit board 15A contained within housing 2 is attached to upper housing section 2B by means of two screws 16. A 3 volt lithium battery 13 is attached to the bottom of printed circuit board 15A by means of a pair of clips 14. The membrane switch unit 17 is attached to the upper surface of printed circuit board 15A and extends through hole 4 in upper surface 9. A metal trace 17A is contacted to provide a switch closure when the upper surface of membrane switch unit 17 is depressed. An output transformer 18, a microcontroller 19, and five light emitting diodes D1–5 are mounted on the upper surface of printed circuit board 15. As shown in FIG. 3B, a piezoelectric transducer 21 is supported on output transformer 18, and is contacted by a "nipple" 11 (FIG. 5) formed on the underside of dome-shaped membrane 6. Piezoelectric transducer 21 can be a Model P/N: 7BB-20-6 available from Murata Electronics North America, Inc.

The dog owner can repetitively depress membrane switch 17 to select one of five stimulus intensity levels. The intensity indicators 10-1,2,3,4,5 become illuminated by light emitting diodes D1–5, respectively, as membrane switch 17 is successively depressed. The five LEDs correspond to indicators 10-1,2,3,4,5 to indicate which stimulation level has been selected by means of the membrane switch 17, and also indicate whether the bark limiter 1 is in a test mode. Holding switch membrane 17 depressed for 4 seconds sets the bark limiter 1 into its test mode, and the various LEDs D1–5 blink, depending on the neck motion and barking by the dog. The LED corresponding to the intensity level selected by means of membrane switch 17 is the one which blinks.

By way of definition, the term "housing" as used herein is intended to encompass any suitable container structure and/or encapsulation material that is used to contain the components of bark limiter 1. The term "bark limiter" is intended to encompass similar devices that detect sounds from animals other than dogs. The bark limiter could be held by a strap against the chest, rather than the neck of an animal.

Figures 1, 4:
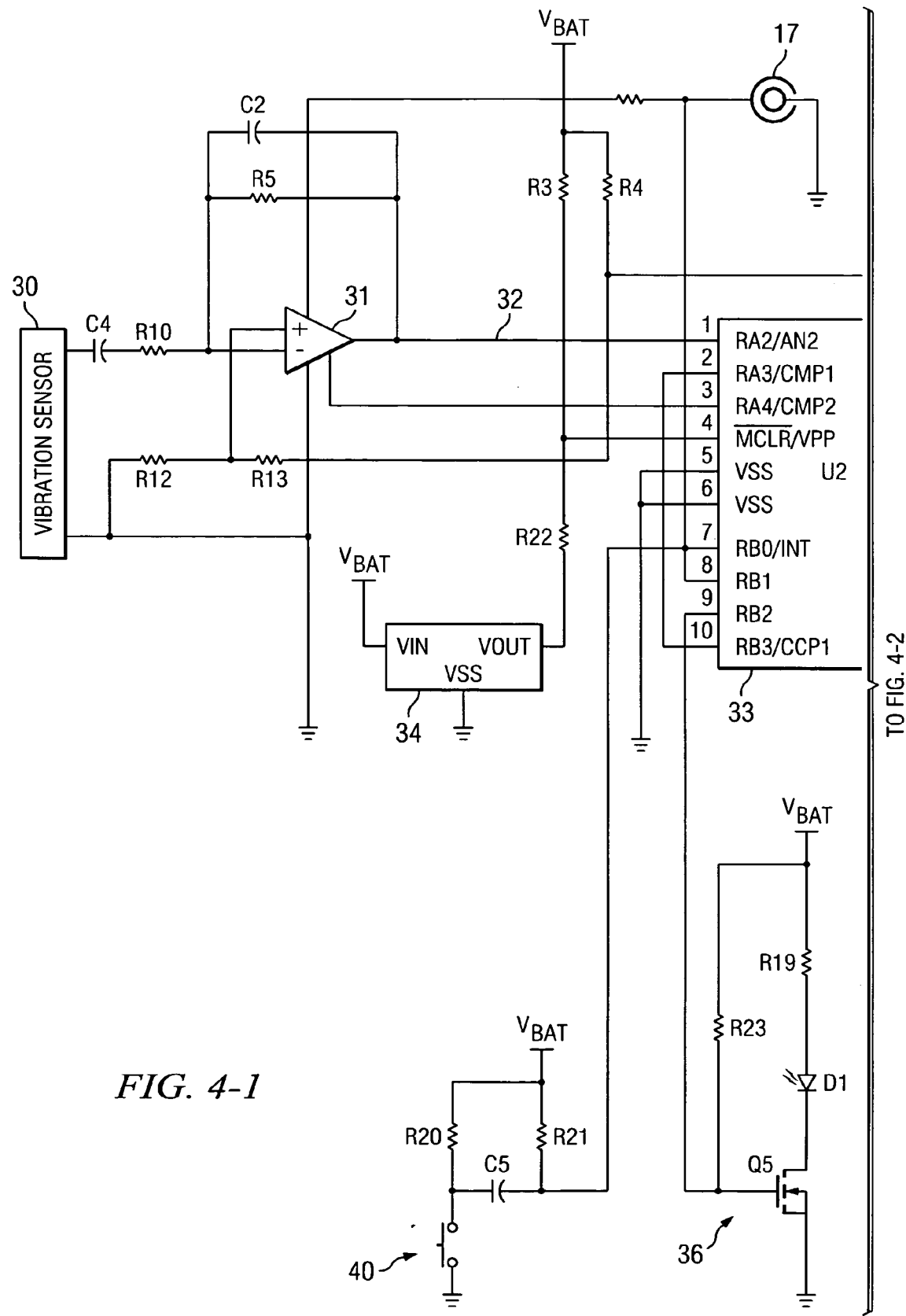
FIG. 4 is a schematic diagram of the circuitry included in the housing of the bark limiter of FIG. 1.
Figures 2, 4:
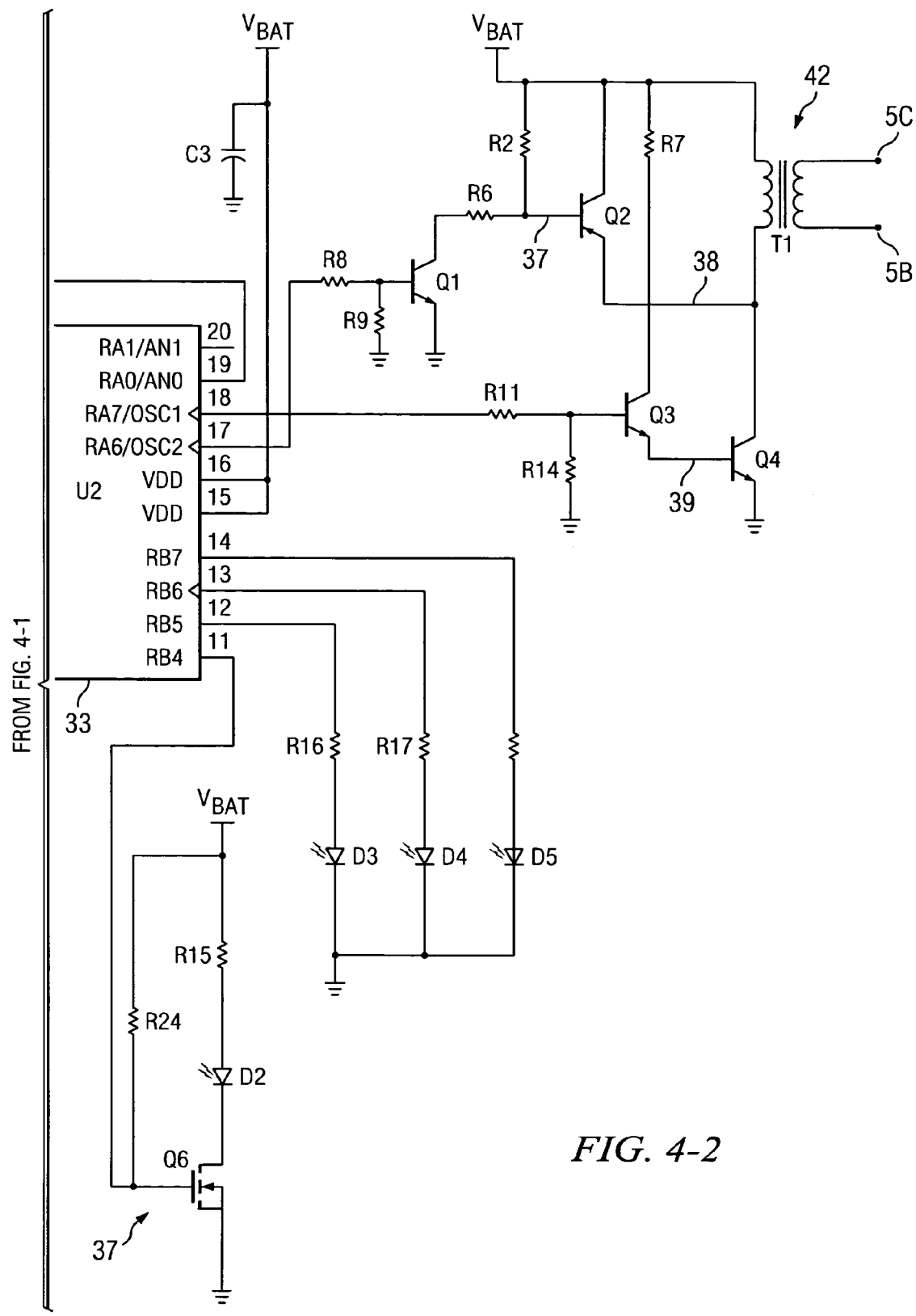

Referring to FIG. 4, the circuitry of bark limiter 1 is provided on the upper surface of printed circuit board 15A (FIG. 3A), and includes vibration sensor assembly 30 which includes above mentioned dome-shaped membrane 6, piezoelectric transducer 21, and the above-mentioned nipple 11 formed on the underside of membrane 6 in order to efficiently transmit vibrations from membrane 6 to piezoelectric transducer 21. One of the electrodes of piezoelectric transducer 21 is connected to ground and the other is coupled by capacitor C4 and resistor R10 to the (−) input of an operational amplifier 31. The (+) input of operational amplifier 31 is connected to the junction between resistor R12 and resistor R13. The other terminal of resistor R12 is connected to ground, and the other terminal of resistor R13 is connected to one terminal of resistor R4 and to the RA0 input on lead 19 of microcontroller 33. The other terminal of resistor R4 is connected to the battery voltage VBAT.

The output of operational amplifier 31 is connected by conductor 32 to the RA2 input on lead 1 of microcontroller 33 and also is connected to one terminal of capacitor C2 and one terminal of resistor R5. The other terminals of resistors R5 and capacitor C2 are connected to the (−) input of operational amplifier 31. The RA2 input of microcontroller 33 is connected to one input of an internal comparator, the other input of which is connected to the RA0 terminal of microcontroller 33, in order to produce an internal square waveform to be used as an input to the internal microprocessor portion of microcontroller 33, to allow the frequency of the square waveform to be determined. The capacitor C2 functions as a low pass filter that sets the upper cutoff frequency of operational amplifier 31. The resistors R5 and R10 to determine the gain of operational amplifier 31.

Voltage monitor circuit 34 in FIG. 4 produces a low output voltage if VBAT is less than approximately 2 volts, applies a reset signal to the microcontroller reset input MCLR on lead 4 thereof if VBAT is below approximately 2 volts. The output of the internal comparator of microcontroller 33 is produced on lead 2 of microcontroller 33, which is externally connected to the CCP1 input on lead 2 of microcontroller 33. The CCP1 input of microcontroller 33 is used in the subsequently described compare-capture mode of operation, to measure the periods of the square waveforms on the CCP1 input. This allows the signals produced by vibration transducer 30 and amplified by operational amplifier 31 to be captured within an approximately 120 millisecond interval and, in effect, captured within an approximately 120 millisecond interval and assembled into a frequency spectrum including sixteen 40 Hz windows in the range from 150 Hz to 800 Hz, which can be used to determine if the present sound is a valid bark.

Actuation of the motion sensor 40 in FIG. 4 results in a signal applied to lead 7 of microcontroller 33 to indicate whether the dog's present neck motion is of the kind characteristically caused by barking. Microprocessor 33 automatically switches from low-power standby operation at 37 kHz to normal operation at 4 MHz if this signal indicates that the dog has begun barking.

The RA6 output on lead 17 of microcontroller 33 is coupled to the base of an NPN transistor Q1 having its emitter connected to ground and its collector coupled by a resistor R6 to the base of a PNP transistor Q2 having its collector connected to VBAT and its emitter connected by conductor 38 to one terminal of the primary winding of output transformer 42. The base of transistor Q2 also is coupled by a resistor R2 to VBAT. The RA7 output on lead 18 of microcontroller 33 is coupled to the base of an NPN transistor Q3 which has its collector coupled by resistor R7 to VBAT and its emitter connected to the base of an NPN transistor Q4. The emitter of transistor Q4 is connected to ground and its collector is connected to conductor 38. The other terminal of the primary winding of output transformer 42 is connected to VBAT. The secondary winding terminals 5B and 5C are connected to the two stimulus electrodes 5. Transistor Q4, when turned on, produces a constant collector current for the entire amount of time that transistor Q4 is turned on. If all of the collector current of transistor Q4 flows through the primary winding of transformer 42, that results in delivery of a maximum amount of energy to the primary winding of transformer 42 and therefore in a maximum amount output energy delivered to the stimulus electrodes 5 by the secondary winding of transformer 42. However, if transistor Q2 is turned on after the peak of the flyback spike that occurs in the waveform of the voltage V38 on conductor 38 immediately after transistor Q4 is turned off, then some of the decaying current in the primary winding of transformer 42 is shunted, causing V38 to rapidly fall to zero. This reduces the amount of energy delivered to the primary winding of transformer 42 for each pulse of the waveform V39 applied to the base of transistor Q4 by microcontroller 33, and therefore also reduces the amount of stimulus energy delivered through stimulus electrodes 5 to the dog's neck. Microcontroller 33 operates to produce a burst of pulses which are applied to the base of transistor Q4 via the Darlington circuit configuration including transistor.

Figure 5A:
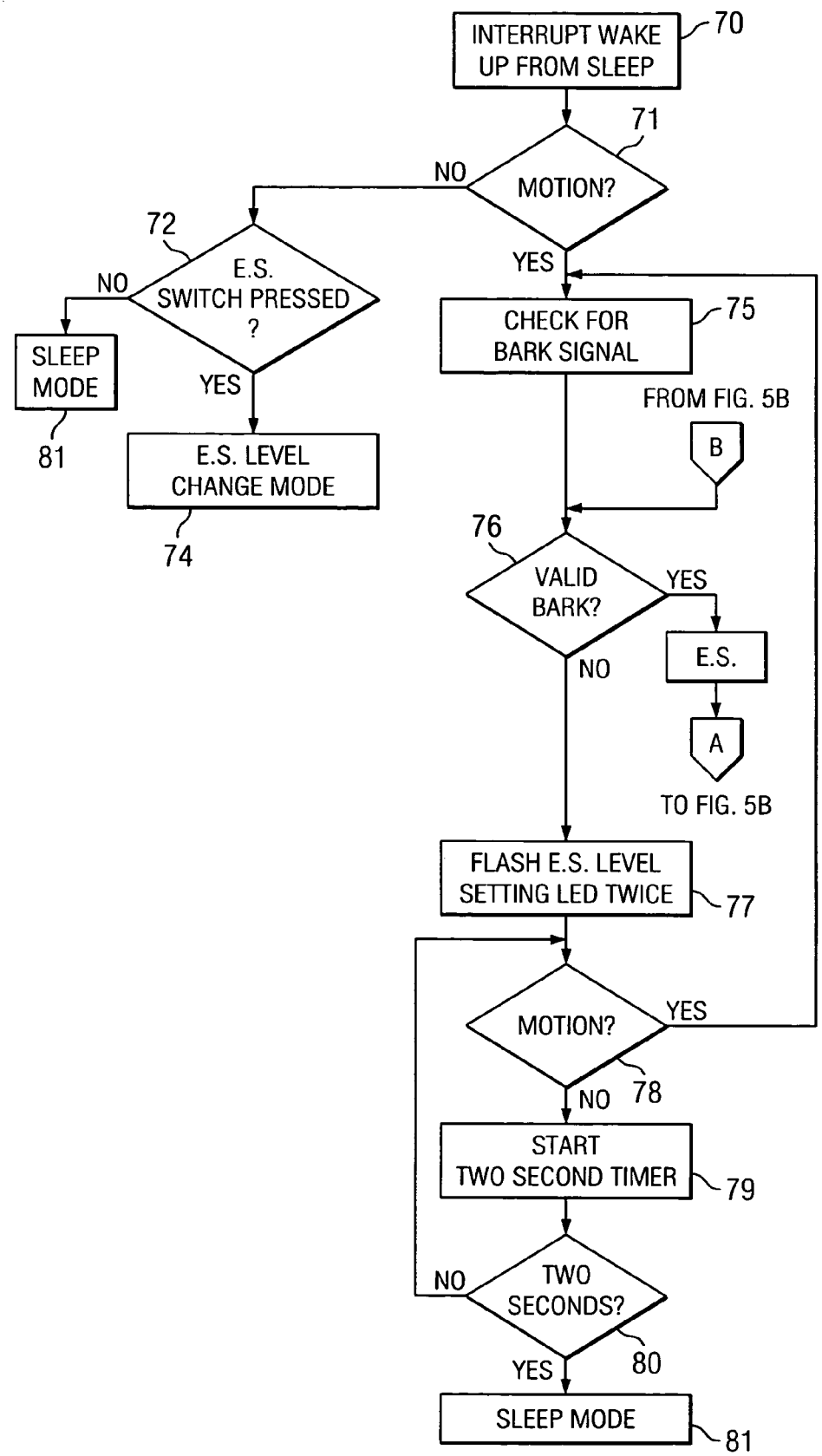
FIGS. 5A and 5B constitute a flowchart of software executed by the microcontroller 33 included in FIG. 4.
Figure 5B:
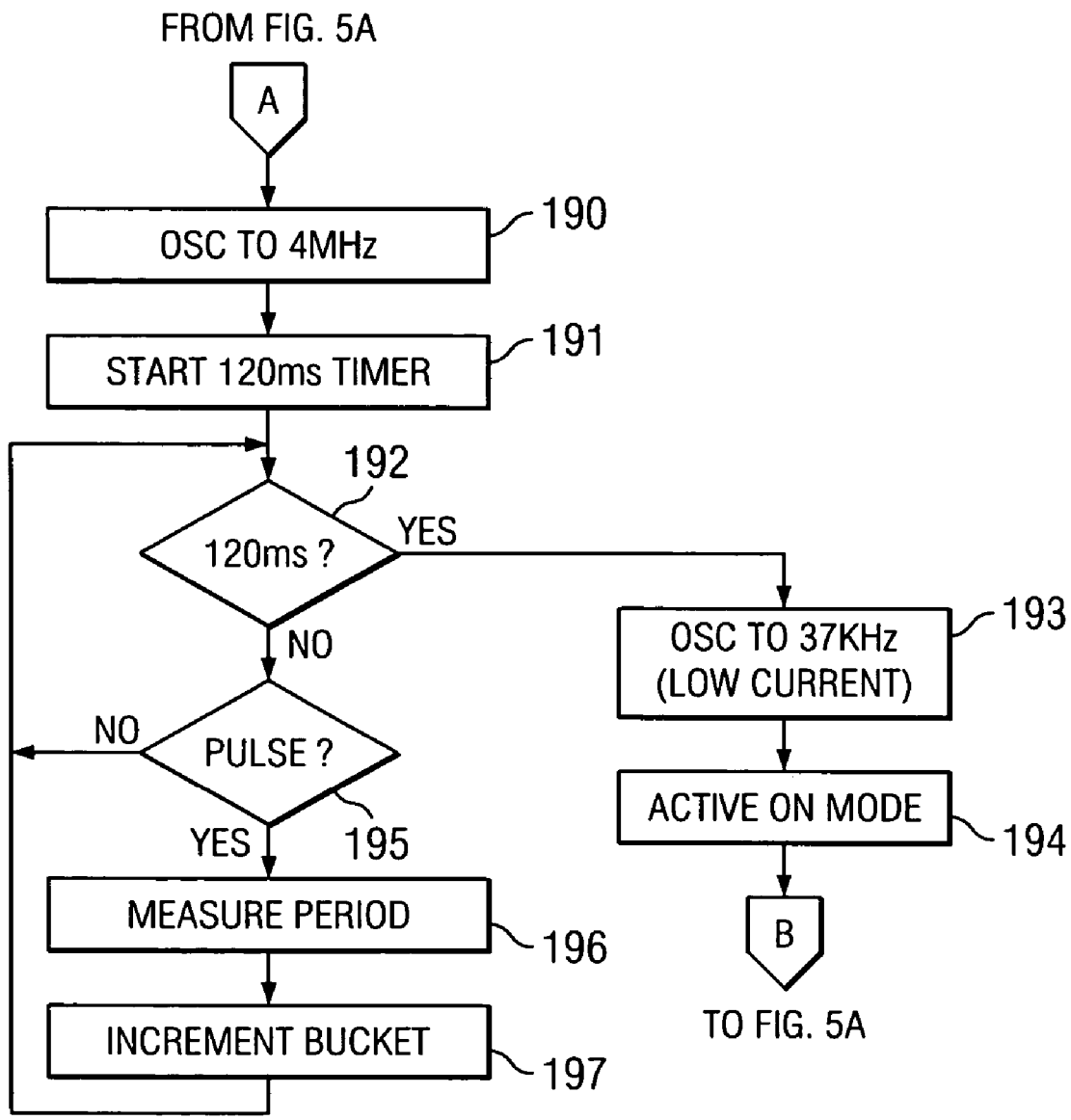

The microcontroller 33 used in the improved bark limiter 1 of the present invention preferably is a PIC16F628 available from Microchip Technology Incorporated, which includes several signal conditioning operational amplifiers, and operates so as to perform the same functions of executing the program represented by the flowchart of FIGS. 5A and 5B. Microcontroller 33 includes a flash memory, a random access memory for storing file registers, and a non-volatile EEPROM for storing the operating program and valid bark detection algorithms. Microcontroller 33 also includes a comparator which generates the signal Data In, and also includes a Vref circuit that produces 1 of 16 voltage levels provided as inputs to the comparator input if the comparator input is configured so that a Vref input is needed.

By way of definition, the terms "controller" and "microcontroller" are used herein is intended to encompass any microcontroller, digital signal processor (DSP), logic circuitry, state machine, and/or programmed logic array (PLA) that performs functions of microcontroller 33 as described above.

Motion sensor 40 can be a Model #SQ-SEN-001P Ultra Compact Tilt and Vibration Sensor, available from SignalQuest Inc. Motion sensor 40 is of a mechanical ball-in-tube construction, and includes a conductive ball that makes contact with appropriate electrodes in response to motion of the dog's neck in order to send the "wake-up" signal microcontroller 33. The assignee has discovered that dogs move their heads in a characteristic manner when they bark, and that using motion detector 40 improves accuracy in detection of "valid" barking. Specifically, the assignee has discovered that when dogs bark, they tend to move their heads and upper torso in a specific motion/pattern motion that can be detected by the above described motion detector 40, although in some instances other types of motion detectors might be used. Motion patterns that are characteristic of barking can be detected using motion detector 40 and, in accordance with the present invention, a captured digitized bark signal can be utilized to provide a frequency spectrum that represents a "valid" bark in order to provide more accurate bark detection that has previously been achieved.

The present invention provides an improved technique of bark detection with software by using the internal "Capture/Compare module" of the PIC16LF627 microcontroller 33 to determine "valid" barks. During a 120 ms (or similar) capture time interval, the periods of the various bark signal frequencies are measured and counted. A window of acceptable frequencies in the range of, for example, 150 Hz–800 Hz, is created by the software. This interval or "window" is divided into 16 "buckets" into which the counts of 16 evenly divided frequency ranges are stored. When a bark/sound signal is received, the periods of the bark frequencies are measured during the 120 ms capture interval. The period of the frequency component of the received bark/sound signal is measured, and if the measured period falls within one of the 16 buckets, i.e. frequency ranges, then a software counter assigned to that bucket is incremented. For each complete bark signal/sound captured, the counter totals are compared to predetermined threshold levels for each corresponding bucket, respectively in order to determine whether the bark/sound constitutes a "valid" bark.

FIG. 5A shows how bark limiter 1 is awakened from its "SLEEP" mode in response to a motion-indicating interrupt signal from motion detector 40, as indicated in decision block 71. If a motion signal is received by microcontroller 33, the program goes from decision block 71 to block 75 and checks to determine if any sound or vibration signal is being received on conductor 32 in response to vibration sensor 30. In decision block 76, the program executes the subroutine of FIG. 5B to determine if the spectrum of sound signals received from vibration sensor 30 is the spectrum of a "valid bark". If this determination is affirmative, the program executes a routine to cause the circuitry including transistors Q1, Q2 and Q3 and transformer 42 to generate an aversive electrical stimulus signal of a selected intensity between stimulation electrodes 5B and 5C.

Referring again to FIG. 5A, if the decision of block 76 is that no valid bark is occurring, the program goes to block 77 and causes the LED corresponding to the selected stimulation level to flash twice, and then goes to decision block 78 and determines if a signal from motion detector 40 indicates that a significant neck motion is occurring. If this determination is affirmative, the program returns to the entry point of block 75 to determine if a bark signal is being received from vibration sensor 30. If the determination of block 78 is negative, the program goes to blocks 79 and 80 and determines if a 2 second interval elapses without neck motion being detected, and if this happens, the program causes microcontroller 33 to go into its sleep mode, as indicated in block 81.

If the determination of decision block 71 is negative, the program goes to decision block 72 and determines if switch 17 is depressed. If switch 17 is not depressed, the program causes microcontroller 33 to go into its sleep mode. If decision block 72 determines that switch 17 is depressed, the program responds in block 74 by determining and storing the new desired stimulus level established by repetitive depressing of switch 17. Specifically, in block 74 the program determines if switch 17 is depressed for more than 1 second, and if this is the case, increments the stimulation level setting from the present level setting (1–5) to the next level setting and saves the new stimulus level setting.

The routine performed in decision block 76 of FIG. 5A is shown in FIG. 5B. Referring to FIG. 5B, in block 190 the program switches the internal oscillator clock frequency of microcontroller 33 from 37 kHz to 4 MHz and then goes to block 191 and starts a 120 millisecond timer, to create a 120 millisecond window within which the frequency spectrum of a "valid bark", if present, is to be "captured". The program then goes to decision block 192 and tests the output of the 120 millisecond timer, and after the 120 millisecond window elapses, the program goes to block 192A and runs a subroutine to determine if the vocalization detected is a valid bark. This is accomplished by comparing the number of times the frequency of the detected vocalization is captured in each frequency range or "bucket" within the 120 millisecond window with a predetermined number of times for each bucket. The program then goes to block 193 and switches the internal oscillator clock frequency of microcontroller 33 back to 37 kHz to provide low power ON mode operation. The program then returns to the entry point of decision block 76 of FIG. 5A.

If block 192 determines that the 120 milliseconds timer is still counting, the program then goes to decision block 195 and determines if there is a change in the level of the signal on leads 2 and 10 of microcontroller 33 to indicate that a "pulse" is present. If this determination is negative, the program reenters the entry point of decision block 192, but if the presence of the pulse is detected, the program goes to block 196 and measures the duration of the pulse, and in block 197 increments the frequency spectrum "bucket" or counter which corresponds to the period (i.e., frequency) measured in block 196. The program then reenters decision block 192 and continues the process until the 120 millisecond timer elapses. The "pulse" referred to is generated on lead 2 of microcontroller 33 from an internal comparator therein and is provided as an input to lead 10 of microcontroller 33, which is the "capture and compare" (CCP1) input of microcontroller 33, and automatically starts a timer at the beginning of the pulse and stops the timer at the end of the pulse, so the frequency of the signal coming from vibration sensor 30 is thereby determined and can be used to select the appropriate frequency spectrum bucket to be incremented in order to acquire the frequency spectrum of the present bark signals received from vibration sensor 30 by one input of the internal comparator referred to. Lead 2 of microcontroller 33 is the output of that comparator. The reference applied to the other input of the internal comparator is established by the voltage on lead 19 by the resistive voltage divider circuitry shown in FIG. 4.

Note that it is important that the dog not be accidentally electrically stimulated if it rubs against something or if miscellaneous vibration is picked up by the vibration sensor 30.

While the invention has been described with reference to several particular embodiments thereof, those skilled in the art will be able to make the various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A method of operating an electronic apparatus to control vocalizing by a dog, the electronic apparatus including
   i. a housing supported against the animal's skin by a strap,
   ii. first and second stimulus electrodes connected to a surface of the housing,
   iii. a sensor supported by the housing for producing signals in response to vocalizing by the dog,
   iv. control circuitry, including a controller, in the housing having an input coupled to an output of the sensor, the control circuitry including output terminals coupled to produce aversive stimulus signals between the first and second stimulus electrodes in response to vocalizing by the dog;
the method comprising:
   (a) electronically converting vocalizing sounds from the dog into a sequence of corresponding signals representing the frequencies of the vocalizing sounds, and providing the sequence of signals as an input to the controller;
   (b) operating the controller to determine the frequencies of the sequence of signals during a predetermined interval of time;
   (c) operating the controller to determine if each measured frequency lies within any of a plurality of predetermined frequency sub-ranges and if so, then incrementing cumulative totals of the frequencies which lie in the sub-ranges, respectively, to provide a plurality of cumulative totals that represent a frequency spectrum of the vocalizing sounds;
   (d) determining whether the barking sounds constitute a valid bark by operating the controller to compare the frequency spectrum to a predetermined valid bark frequency spectrum; and
   (e) operating the microcontroller to cause the control circuitry to cause appropriate aversive stimulus signals to be produced between the first and second stimulus electrodes if the determination of step (d) determines that the vocalizing sounds constitute a valid bark.

2. A method of operating a collar-mounted electronic apparatus to control barking by a dog, the electronic apparatus including
   i. a housing supported by a collar for attachment to the dog's neck,
   ii. first and second stimulus electrodes connected to a surface of the housing,
   iii. a sensor supported by the housing for detecting vibrations caused by vocalizing and/or barking by the dog,
   iv. control circuitry, including a microcontroller, in the housing having an input coupled to an output of the sensor, the control circuitry including output terminals coupled to produce aversive stimulus signals between the first and second stimulus electrodes in response to barking by the dog;
the method comprising:
   (a) providing a range of frequencies within which valid barking sounds fall and a plurality of sub-ranges within the range;
   (b) electronically converting barking sounds from the dog into a sequence of corresponding signals representing the frequencies of the barking sounds, and providing the sequence of signals as an input to the microcontroller;
   (c) operating the microcontroller to determine the frequencies of the sequence of signals during a predetermined interval of time;
   (d) operating the microcontroller to determine if each measured frequency lies within any of the sub-ranges and if so, then incrementing a cumulative total of the frequencies which lie in that sub-range to provide a plurality of cumulative totals that represent a frequency spectrum of the barking sounds;
   (e) determining whether the vocalizing sounds constitute a valid bark by operating the microcontroller to compare the frequency spectrum to a predetermined valid bark frequency spectrum; and
   (f) operating the microcontroller to cause the control circuitry to cause appropriate aversive stimulus signals to be produced between the first and second stimulus electrodes if the determination of step (e) determines that the barking sounds constitute a valid bark.

3. The method of claim 2 wherein the range of frequencies is from 150 hertz to 800 Hz.

4. The method of claim 3 wherein the number of sub-ranges is 16.

5. The method of claim 2 wherein the sub-ranges are contiguous across the range.

6. The method of claim 2 wherein the predetermined interval of time is approximately 120 milliseconds.

7. An electronic apparatus for controlling vocalizing by a dog, the electronic apparatus including:
  (a) a housing supported against the animal's skin;
  (b) first and second stimulus electrodes connected to a surface of the housing;
  (c) a sensor supported by the housing for producing signals in response to vocalizing by the dog;
  (d) control circuitry, including a controller, in the housing having an input coupled to an output of the sensor, the control circuitry including output terminals coupled to produce aversive stimulus signals between the first and second stimulus electrodes in response to vocalizing by the dog;
  (e) the control circuitry electronically converting vocalizing sounds from the dog into a sequence of corresponding signals representing the frequencies of the vocalizing sounds, and providing the sequence of signals as an input to the controller;
  (f) the controller executing a stored program to determine the frequencies of the sequence of signals during a predetermined interval of time;
  (g) the controller executing the stored program to determine if each measured frequency lies within any of a plurality of predetermined frequency sub-ranges and if so, then incrementing cumulative totals of the frequencies which lie in the sub-ranges, respectively, to provide a plurality of cumulative totals that represent a frequency spectrum of the vocalizing sounds;
  (d) the controller executing the stored program to determine whether the barking sounds constitute a valid bark by operating the controller to compare the frequency spectrum to a predetermined valid bark frequency spectrum; and
  (e) the controller executing the stored program to cause the control circuitry to produce appropriate aversive stimulus signals between the first and second stimulus electrodes if the vocalizing sounds constitute a valid bark.

8. The electronic apparatus of claim 7 wherein the range of frequencies is from 150 hertz to 800 Hz.

9. The electronic apparatus of claim 7 wherein the number of sub-ranges is 16.

10. The electronic apparatus of claim 7 wherein the sub-ranges are contiguous across the range.

11. The electronic apparatus of claim 7 wherein the predetermined interval of time is approximately 120 milliseconds.

12. An electronic apparatus for controlling vocalizing by a dog:
  (a) a housing supported against the animal's skin by a strap;
  (b) first and second stimulus electrodes connected to a surface of the housing;
  (c) a sensor supported by the housing for producing signals in response to vocalizing by the dog;
  (d) control circuitry, including a controller, in the housing having an input coupled to an output of the sensor, the control circuitry including output terminals coupled to produce aversive stimulus signals between the first and second stimulus electrodes in response to vocalizing by the dog;
  (e) means for electronically converting vocalizing sounds from the dog into a sequence of corresponding signals representing the frequencies of the vocalizing sounds and providing the sequence of signals as an input to the controller;
  (f) means for operating the controller to determine the frequencies of the sequence of signals during a predetermined interval of time;
  (g) means for operating the controller to determine if each measured frequency lies within any of a plurality of predetermined frequency sub-ranges and if so, then incrementing cumulative totals of the frequencies which lie in the sub-ranges, respectively, to provide a plurality of cumulative totals that represent a frequency spectrum of the vocalizing sounds;
  (h) means for comparing the frequency spectrum to a predetermined valid bark frequency spectrum to determine whether the barking sounds constitute a valid bark by operating the controller to; and
  (i) means for operating the microcontroller to cause the control circuitry to cause appropriate aversive stimulus signals to be produced between the first and second stimulus electrodes if the determination of step (d) determines that the vocalizing sounds constitute a valid bark.

* * * * *